United States Patent
Glück

(10) Patent No.: US 10,688,877 B2
(45) Date of Patent: Jun. 23, 2020

(54) METHOD FOR OPERATING A BRAKE SYSTEM FOR A MOTOR VEHICLE AND CORRESPONDING BRAKE SYSTEM

(71) Applicant: AUDI AG, Ingolstadt (DE)

(72) Inventor: Christian Glück, Eichstätt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/244,255

(22) Filed: Jan. 10, 2019

(65) Prior Publication Data

US 2019/0241077 A1    Aug. 8, 2019

(30) Foreign Application Priority Data

Feb. 5, 2018  (DE) .................. 10 2018 201 689

(51) Int. Cl.
*B60L 15/20*    (2006.01)
*B60L 7/18*    (2006.01)
(Continued)

(52) U.S. Cl.
CPC ......... *B60L 15/2009* (2013.01); *B60L 3/0015* (2013.01); *B60L 3/0076* (2013.01); *B60L 3/0092* (2013.01); *B60L 3/08* (2013.01); *B60L 3/108* (2013.01); *B60L 7/10* (2013.01); *B60L 7/18* (2013.01); *B60L 7/24* (2013.01); *B60L 7/26* (2013.01); *B60L 7/28* (2013.01); *B60L 50/10* (2019.02); *B60L 50/60* (2019.02); *B60L 50/61* (2019.02); *B60W 30/18127* (2013.01);
(Continued)

(58) Field of Classification Search
CPC ............... B60L 15/2009; B60L 7/28

USPC ..................................... 318/376, 34
See application file for complete search history.

(56) References Cited

U.S. PATENT DOCUMENTS 6,199,650 B1 * 3/2001 Masberg .................. B60K 6/26
180/197
7,378,808 B2 * 5/2008 Kuras ...................... B60K 6/46
318/139
(Continued)

FOREIGN PATENT DOCUMENTS

DE     4142863 A1    4/1993
DE     195 13 696 A1    10/1996
(Continued)

OTHER PUBLICATIONS

Examination Report dated Sep. 14, 2018 of corresponding German application No. 102018201689.5; 10 pages.
(Continued)

*Primary Examiner* — David Luo
(74) *Attorney, Agent, or Firm* — Maier & Maier, PLLC

(57) ABSTRACT

A method for operating a brake system for a motor vehicle, wherein the brake system comprises an eddy current brake mechanically coupled to at least one wheel of the motor vehicle for providing a braking force acting on the wheel, wherein an electric machine is mechanically coupled or can be coupled to the wheel and is electrically connected to the eddy current brake. In this case, it is provided that, in an emergency braking mode for braking the wheel, the eddy current brake is supplied in parallel with energy provided by means of the electric machine operating as a generator and with electrical energy taken from an energy accumulator. The disclosure furthermore relates to a brake system for a motor vehicle.

9 Claims, 2 Drawing Sheets

(51) Int. Cl.
  *B60L 7/28* (2006.01)
  *B60L 7/10* (2006.01)
  *B60L 3/00* (2019.01)
  *B60L 7/24* (2006.01)
  *B60L 3/10* (2006.01)
  *B60L 50/61* (2019.01)
  *B60L 50/10* (2019.01)
  *B60L 50/60* (2019.01)
  *B60L 3/08* (2006.01)
  *B60L 7/26* (2006.01)
  *B60W 30/18* (2012.01)

(52) U.S. Cl.
  CPC ....... *B60L 2220/44* (2013.01); *B60L 2240/12* (2013.01); *B60L 2240/14* (2013.01); *B60L 2240/22* (2013.01); *B60L 2240/427* (2013.01); *B60L 2240/429* (2013.01); *B60L 2240/463* (2013.01); *B60L 2240/465* (2013.01); *B60L 2240/50* (2013.01); *B60L 2240/647* (2013.01); *B60L 2260/26* (2013.01)

(56) References Cited

U.S. PATENT DOCUMENTS

| 7,957,881 B2* | 6/2011 | Itoh | B60T 8/175 |
| | | | 180/197 |
| 2012/0226419 A1 | 9/2012 | Harnisch et al. | |
| 2014/0076641 A1 | 3/2014 | Penev | |

FOREIGN PATENT DOCUMENTS

| DE | 102009006196 A1 | 7/2010 |
| DE | 102010064252 A1 | 1/2012 |
| DE | 10 2010 044 655 A1 | 3/2012 |
| WO | 2013186158 A2 | 12/2013 |
| WO | 2017/202576 A1 | 11/2017 |

OTHER PUBLICATIONS

European Search Report dated Jul. 1, 2019 in corresponding European Application No. 18211633.5; 10 pages including partial machine-generated English-language translation.

* cited by examiner

METHOD FOR OPERATING A BRAKE SYSTEM FOR A MOTOR VEHICLE AND CORRESPONDING BRAKE SYSTEM

FIELD

The invention relates to a method for operating a brake system for a motor vehicle, wherein the brake system comprises an eddy current brake coupled to at least one wheel of the motor vehicle for providing a braking force acting on the wheel, wherein an electric machine is mechanically coupled or can be coupled to the wheel and is electrically connected to the eddy current brake. The invention furthermore relates to a brake system for a motor vehicle.

BACKGROUND

There is known from the prior art, for example, the publication DE 10 2010 064 252 A1. This describes an auxiliary brake system for an at least electrically driven motor vehicle. A first electric machine, which is designed as an electric motor and as a counter-current brake, is used in order to generate additional braking forces in the vehicle. The electrical energy required for this is provided by a second electric machine, which is coupled as a generator brake to an internal combustion engine of the motor vehicle.

SUMMARY

The object of the invention is to propose a method for operating a brake system for a motor vehicle that has benefits over known methods, especially making possible a quick braking of the motor vehicle that is extremely reliable under the most diverse environmental conditions.

This is achieved according to the invention with a method for operating a brake system having the features of claim 1. In this case, in an emergency braking mode for braking the wheel, it is provided that the eddy current brake is supplied in parallel with electrical energy provided by means of the electric machine operating as a generator and with electrical energy taken from an energy accumulator.

The brake system serves for a braking the motor vehicle and is preferably designed as a service brake system for this purpose. The brake system comprises the electric machine and the eddy current brake, both of which can be actuated to brake the wheel of the motor vehicle. In order to operate the eddy current brake, i.e., to bring about the braking force acting on the wheel by means of the eddy current brake, the eddy current brake is supplied with electrical energy. In other words, the eddy current brake brings about the braking force acting on the wheel as soon as, and for as long as, it is supplied with electrical energy.

The electric machine may at the same time be a component of a drive device for the motor vehicle and accordingly provide, at least for some of the time, a torque directed at driving the motor vehicle. Within the brake system, however, the electric machine is operated for the most part to bring about a braking force acting on the wheel and hence the braking of the wheel. Here as well, however, a driving of the wheel may be provided, for example, in the context of an antilock function. The motor vehicle preferably has several wheels, of which at least one, but preferably several, constitutes or constitute the at least one wheel.

In addition to the electric machine and the eddy current brake, the brake system may have a mechanical brake, which can be alternatively called a friction brake. The mechanical brake is also designed to brake the wheel or to bring about a braking force acting on the wheel. Preferably, the mechanical brake is only placed in use when a braking of the wheel by means of the electric machine and the eddy current brake is not possible. In order to implement the mentioned antilock function, it may be provided to brake the wheel by means of the mechanical brake and at the same time—if necessary—to drive it by means of the electric machine, in order to prevent a locking of the wheel. In other words, the electric machine works against the mechanical brake, so that the locking of the wheel is prevented or ended.

Both the electric machine and the eddy current brake are mechanically coupled to the wheel, at least for a time or permanently. For example, it may be provided to associate the eddy current brake directly with the wheel and to have it coupled permanently to the wheel or to a wheel axle, whereas the eddy current brake is connected by a shift clutch to the wheel, by means of which the operative connection between the eddy current brake and the wheel can be optionally interrupted or restored. However, it may also be provided that the electric machine and the eddy current brake are each associated directly with the wheel and preferably coupled permanently to it. In the latter case, the electric machine and the eddy current brake are, for example, part of a single-wheel drive for the wheel.

Basically, it is desirable to use the mechanical brake as little as possible. This has already been pointed out. However, a reliable braking of the wheel must be assured in each instance and in all circumstances. For this reason, it is proposed, in the emergency braking mode, to supply the eddy current brake not only with electrical energy from an energy source, but instead with electrical energy from several energy sources. The energy sources used here are the electric machine, which is operated as a generator, and the energy accumulator, which serves for interim storage of electrical energy.

In the emergency braking mode, the electric machine can basically be driven in any way desired. For example, the electric machine that works in the emergency braking mode as a generator is mechanically coupled to the wheel, so that the electric machine partially produces the braking force acting on the wheel. The rest of the braking force is generated by the eddy current brake.

Alternatively, however, it may also be provided that the electric machine in the emergency braking mode is mechanically decoupled from the wheel, for example, by opening the already aforementioned shift clutch. In this case, for example, the electric machine is driven by means of the drive device or a drive assembly of the drive device of the motor vehicle to provide the electrical energy for the eddy current brake.

The drive assembly may be present as another electric machine or be designed as an internal combustion engine or the equivalent. In such a procedure, the electric machine does not contribute to generating the braking force acting on the wheel. Instead, this braking force is created solely by means of the eddy current brake.

On the one hand, therefore, the eddy current brake is supplied with the electrical energy that is generated with the aid of the electric machine. On the other hand, in addition, the eddy current brake should be connected electrically to the energy accumulator and draw electrical energy from it for operating the eddy current brake. Preferably, the electric machine and the energy accumulator are electrically connected in parallel to the eddy current brake, this being the case especially so that the electrical energy provided by means of the electric machine is supplied not to the energy accumulator, but rather to the eddy current brake. For example, an appropriate circuitry of the electric machine, the energy accumulator and the eddy current brake is provided for this purpose, for example, making use of at least one diode.

Thanks to the electrical connection of the eddy current brake to several energy sources or the supplying of the eddy current brake with electrical energy drawn from the several energy sources, an especially high functional reliability is assured for the eddy current brake. Thus, in particular, a braking of the wheel or of the motor vehicle is also made possible if a malfunction of the electric machine or the energy accumulator occurs.

For this purpose, more preferably, the electric machine and the energy accumulator are designed such that they can each alone provide the electrical energy needed to bring about the braking force acting on the wheel by means of the eddy current brake in the emergency braking mode. With such a design of the brake system, reliable braking can take place for the wheel or the motor vehicle even during a complete failure of the electric machine or the energy accumulator.

Another embodiment of the invention proposes that the electric machine is operated as a motor in a driving mode for driving the wheel. This was already pointed out briefly above. Accordingly, the electric machine may not only be operated as a generator to transform mechanical kinetic energy of the wheel into electrical energy, but also conversely as a motor, so that electrical energy is transformed into mechanical kinetic energy of the wheel. For example, the electric machine in this case is not only part of the brake system, but also, in addition, it is part of the drive device for the motor vehicle.

It may be provided that, in the driving mode, the electric machine is operated as a motor for driving the wheel and, at the same time, the wheel is braked with the aid of the eddy current brake, so that the eddy current brake thus works counter to the electric machine. Both the electric machine and the eddy current brake are supplied with electrical energy in this case, which is drawn for example from the energy accumulator. Such a procedure may be performed, for example, in order to stabilize the motor vehicle. In particular, a drive slip control is realized in this way. On the whole, an extremely flexible operation of the electric machine thus results.

Another preferred embodiment of the invention proposes that the electric machine is operated as a generator in a recuperation mode for braking the wheel, wherein, in this case, the electrical energy accruing is at least partly stored temporarily in the energy accumulator. In the recuperation mode, the wheel or the motor vehicle should be braked in such a way that as large an amount of the mechanical kinetic energy of the wheel as possible is not lost, but instead transformed into electrical energy. The electrical energy accruing in the recuperation mode is at least partly or even entirely stored temporarily in the energy accumulator. However, it can also be drawn upon in part for the operation of an onboard network of the motor vehicle. The recuperation mode makes possible an energy-efficient operation of the brake system.

Another embodiment of the invention proposes that, in the recuperation mode, the eddy current brake is operated to release the wheel. In other words, the eddy current brake should be actuated in such a way that it releases a rotational motion of the wheel and hence produces no braking force on it. Thus, in the recuperation mode, the braking force acting on the wheel is generated solely by means of the electric machine, so that the efficiency of the brake system is significantly improved.

In the context of another preferred embodiment of the invention, it may be provided that, in a braking mode, the electric machine and the eddy current brake are actuated to brake the wheel, wherein the eddy current brake is electrically decoupled from the energy accumulator and supplied with electrical energy provided by the electric machine. The braking mode accordingly differs from the recuperation mode by the additional use of the eddy current brake for the braking of the wheel. The braking force acting on the wheel is accordingly generated in part by the electric machine and in part by the eddy current brake. For this purpose, the electric machine is operated as a generator.

The electrical energy accruing by the generator operation of the electric machine is at least partly, preferably mostly or even entirely, supplied to the eddy current brake. At the same time, the eddy current brake is electrically decoupled from the energy accumulator, so that the eddy current brake is operated solely with electrical energy generated by means of the electric machine. Thus, in the braking mode, no electrical energy provided from the outside is needed, in particular no electrical energy drawn from the energy accumulator. In this way, a high efficiency of the brake system is achieved.

One preferred embodiment of the invention proposes that, in the braking mode, the electric machine is decoupled from the energy accumulator. This ensures that the eddy current brake is operated solely with that electrical energy which is generated by means of the electric machine. In this way, a high efficiency of the brake system is maintained. Another preferred embodiment of the invention proposes that, in the braking mode, when a target braking force exceeds the maximum braking force that can be produced on the wheel by the electric machine, the electric machine is adjusted to generate the maximum braking force and a proportion of the electrical energy provided by the electric machine and supplied to the eddy current brake is adjusted in such a way that the electric machine and the eddy current brake together bring about a braking force on the wheel corresponding to the target braking force.

The target braking force means the braking force that should be acting on the wheel. The target braking force, for example, is dictated by the driver of the motor vehicle and/or by a driver assist device of the motor vehicle. In particular, the driver enters the target braking force by way of an operator element, preferably a brake pedal. The maximum braking force of the electric machine corresponds to that braking force which is the maximum braking force that can be produced solely by means of the electric machine. Accordingly, the maximum braking force represents the largest braking force that can be produced by using the electric machine.

For example, the recuperation mode is performed until such time as the target braking force is less than the maximum braking force, so that the braking force produced on the wheel is provided solely by means of the electric machine. But if the target braking force goes beyond the maximum braking force, it is necessary to bring about an additional braking force on the wheel. The eddy current brake is used for this purpose. Accordingly, for example, when the target braking force exceeds the maximum braking force, there is a switch to the braking mode. However, it may also be provided that even when the target braking force falls short of the maximum braking force, the braking mode will be present, so that the braking force acting on the wheel is always provided by means of the electric machine and the eddy current brake, for example, in equal proportions.

However, in every instance when the target braking force exceeds the maximum braking force in the braking mode, the electric machine will produce a braking force on the wheel corresponding to the maximum braking force. In this case, it works as a generator, so that the mechanical kinetic energy of the wheel is transformed into electrical energy. At least a proportion of this electrical energy is now supplied to the eddy current brake, in order to apply the difference between the target braking force and the maximum braking force to the wheel by means of the eddy current brake. In other words, the eddy current brake should be supplied with enough electrical energy so that the braking force corresponding to the target braking force is applied to the wheel.

For example, it is now provided that, if the electrical energy provided by the electric machine and supplied to the eddy current brake is not enough to apply to the wheel the braking force corresponding to the target braking force, there is a switch to the emergency braking mode. In this mode, according to the further statements in the context of this description, additional electrical energy is drawn from the energy accumulator and supplied to the eddy current brake. Accordingly, an extremely reliable and rapid braking of the motor vehicle is realized.

Finally, it may be provided in the context of another preferred embodiment of the invention that, in the emergency braking mode, the electric machine is adjusted to generate the maximum braking force, and the electrical energy provided by the electric machine is supplied entirely to the eddy current brake. This has already been mentioned above. Such a procedure results in an especially large braking force acting on the wheel. In addition to the electrical energy provided by means of the electric machine, the eddy current brake in the emergency braking mode is supplied with the electrical energy drawn from the energy accumulator, so that a very rapid and reliable braking of the wheel or the motor vehicle is realized.

The invention furthermore relates to a brake system for a motor vehicle, especially in order to carry out the method according to the statements in the context of this description, wherein the brake system comprises an eddy current brake mechanically coupled to at least one wheel of the motor vehicle for providing a braking force acting on the wheel, wherein an electric machine is mechanically coupled or can be coupled to the wheel and is electrically connected to the eddy current brake. It is provided that, in an emergency braking mode for braking the wheel, the brake system is designed to supply the eddy current brake in parallel with energy provided by means of the electric machine operating as a generator and with electrical energy taken from an energy accumulator.

The benefits of such a design of the brake system or of such a procedure have already been pointed out. Both the brake system and the method for its operation can be enhanced according to the statements in the context of this description, so that reference is made accordingly to these.

Another preferred embodiment of the invention proposes that the electric machine and the eddy current brake are arranged on a common shaft. This is the case, for example, if the electric machine is present as part of a single-wheel drive for the wheel. Especially preferred, the motor vehicle will have several such single-wheel drives, being associated with at least one wheel of the motor vehicle. Especially preferred, an electric machine and an eddy current brake are associated with each wheel of the motor vehicle, and these are permanently mechanically coupled to the wheel.

BRIEF DESCRIPTION OF THE DRAWINGS

The invention shall now be explained more closely with the aid of exemplary embodiments represented in the drawing, without resulting in limiting the invention. Shown herein are.

DETAILED DESCRIPTION

Figure 1:
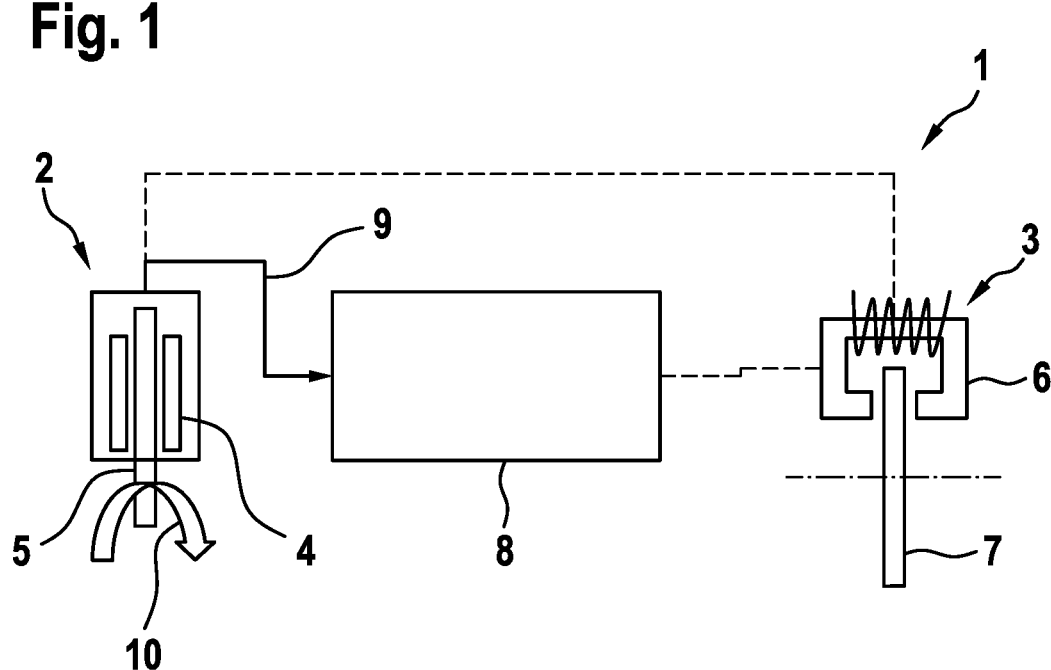
FIG. 1 a schematic representation of a brake system for a motor vehicle in a recuperation mode.

FIG. 1 shows a schematic representation of a brake system 1 for a motor vehicle. The brake system 1 serves for applying a braking force to a wheel of the motor vehicle, which is not shown here. The brake system 1 comprises an electric machine 2 and an eddy current brake 3. The electric machine 2 has a stator 4 and a rotor 5, which is mounted rotatably with respect to the stator 4.

The electric machine 2 or its rotor 5 are mechanically coupled or at least can be coupled to the wheel of the motor vehicle. In the latter case, for example, the wheel may be mechanically connected to the rotor 5 by way of a shift clutch. The eddy current brake 3 likewise has a stator 6 and a rotor 7. Here as well, the rotor 7 is mounted rotatably with respect to the stator 6. The rotor 7 is mechanically coupled or at least can be coupled to the wheel of the motor vehicle. Especially preferred, the rotor 7 is in permanent operative connection to the wheel.

A braking force may be imposed on the wheel of the motor vehicle both by means of the electric machine 2 and by means of the eddy current brake 3. The brake system 1 is represented in a recuperation mode, in which the braking force is applied to the wheel solely by means of the electric machine 2. The eddy current brake 3, on the other hand, is adjusted to release the wheel or is operated to release the wheel.

By applying the braking force to the wheel by means of the electric machine 2, kinetic motion energy of the wheel is transformed into electrical energy. This energy is stored temporarily in an energy accumulator 8. This is indicated by the arrow 9. Likewise shown is the braking force exerted on the wheel by the electric machine 2, namely, by the arrow 10.

Figure 2:
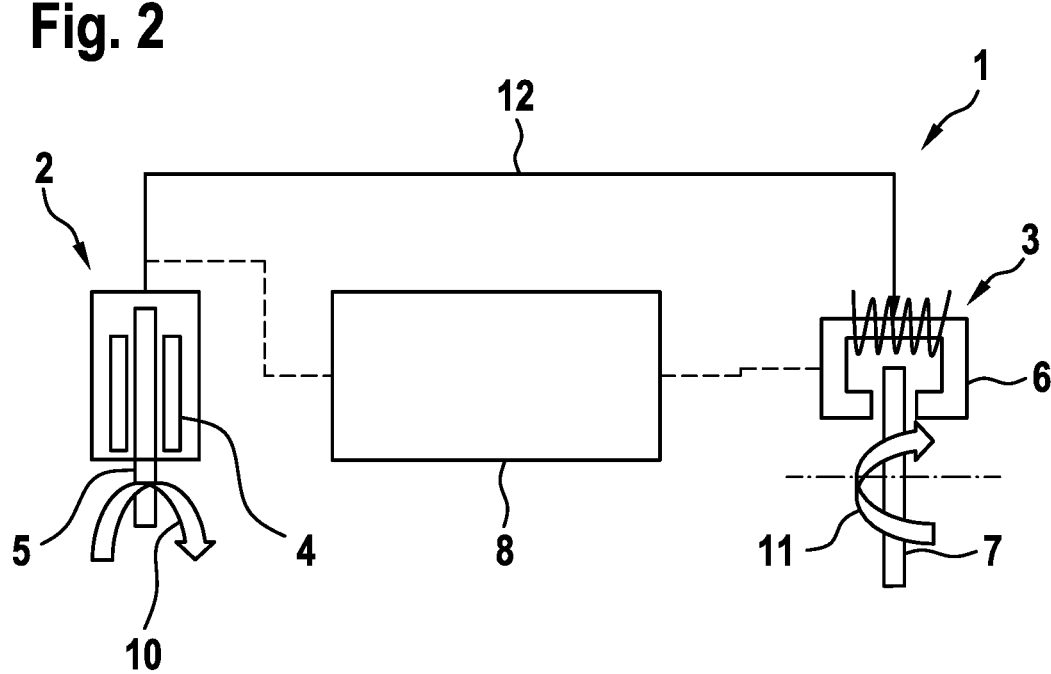
FIG. 2 a schematic representation of the brake system in a braking mode.

FIG. 2 shows the brake system 1 in a schematic representation where the brake system 1 is in a braking mode. In this case, the braking force acting on the wheel is produced jointly by the electric machine 2 and the eddy current brake 3. This is represented by the arrows 10 and 11. In the braking mode, the electrical energy provided by means of the electric machine 2 is supplied to the eddy current brake 3 for the braking of the wheel. This is indicated by the arrow 12.

This means that the energy accumulator 8 is preferably decoupled from the electric machine 2 and the eddy current brake 3, so that the entire energy provided by the electric machine 2 is drawn upon by the eddy current brake 3 to generate the braking force on the wheel. In such a procedure, the proportions of braking force from the electric machine 2 and the eddy current brake 3 preferably lie in the same order of magnitude; for example, they are identical or at least almost identical.

Figure 3:
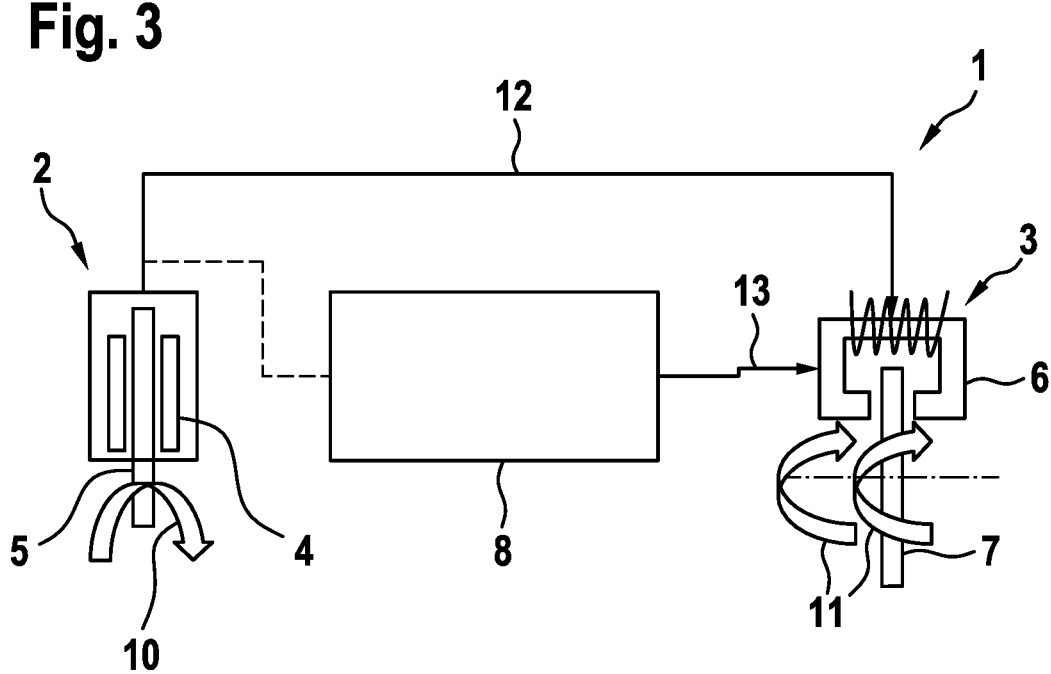
FIG. 3 a schematic representation of the brake system in an emergency braking mode.

FIG. 3 again shows a schematic representation of the brake system 1, wherein it is operated in an emergency braking mode. In this mode, the electric machine 2 is operated similar to the braking mode for transforming kinetic energy of the wheel into electrical energy. Once again, the energy is supplied to the eddy current brake 3. Accordingly, both the electric machine 2 and the eddy current brake 3 contribute to generating the braking force on the wheel of the motor vehicle.

However, in addition, it is now provided to supply electrical energy to the eddy current brake 3, having been drawn from the energy accumulator 8. This is indicated by the arrow 13. Accordingly, the eddy current brake 3 can provide a considerably larger proportion of the braking force on the wheel than is possible during the braking mode. This is indicated by the double arrow 11.

For example, the proportion of the eddy current brake 3 in the braking force on the wheel that is produced by the electric machine 2 and the eddy current brake 3 is at least 60%, at least 70%, at least 75% or at least 80%. Accordingly, a very large braking force is realized on the wheel, so that a rapid reduction in speed of the motor vehicle occurs.

On the whole, with the brake system 1 according to the statements in the context of this description, an extremely energy-efficient operation is realized and at the same time excellent safety is achieved. Thus, in the emergency braking mode, on the one hand, a very large braking force is produced on the wheel. On the other hand, it is ensured that, even if one energy source is defective, such as the electric machine 2 or the energy accumulator 8, a sufficiently large braking force will continue to be applied to the wheel by means of the eddy current brake 3. Accordingly, in this case as well, an adequate deceleration of the motor vehicle is realized.

The invention claimed is:

1. A method for operating a brake system for a motor vehicle, comprising:
   an eddy current brake mechanically coupled to at least one wheel of the motor vehicle for providing a braking force acting on the wheel;
   an electric machine that is mechanically coupled or can be coupled to the wheel and that is electrically connected to the eddy current brake; and
   an energy accumulator,
   wherein, in an emergency braking mode for braking the wheel, the eddy current brake is supplied in parallel with electrical energy provided by means of the electric machine operating as a generator and with electrical energy taken from the energy accumulator,
   wherein in a braking mode, the electric machine and the eddy current brake are actuated to brake the wheel, wherein the eddy current brake is electrically decoupled from the energy accumulator and supplied with electrical energy provided by the electric machine.

2. The method as claimed in claim 1, wherein the electric machine is operated as a motor in a driving mode for driving the wheel.

3. The method as claimed in claim 1, wherein the electric machine is operated as a generator in a recuperation mode for braking the wheel, wherein the electrical energy accruing thereby is at least partly stored temporarily in the energy accumulator.

4. The method as claimed in claim 3, wherein in the recuperation mode the eddy current brake is operated to release the wheel.

5. The method as claimed in claim 1, wherein in the braking mode, the electric machine is decoupled from the energy accumulator.

6. The method as claimed in claim 1, wherein in the braking mode, when a target braking force exceeds a maximum braking force produced on the wheel by the electric machine, the electric machine is adjusted to generate the maximum braking force, and a proportion of the electrical energy provided by the electric machine and supplied to the eddy current brake is adjusted in such a way that the electric machine and the eddy current brake together bring about a braking force on the wheel corresponding to the target braking force.

7. The method as claimed in claim 1, wherein in the emergency braking mode, the electric machine is adjusted to generate the maximum braking force and the electrical energy provided by the electric machine is supplied entirely to the eddy current brake.

8. A brake system for a motor vehicle, wherein the brake system comprises:
   an eddy current brake mechanically coupled to at least one wheel of the motor vehicle for providing a braking force acting on the wheel
   an electric machine that is mechanically coupled or can be coupled to the wheel and that is electrically connected to the eddy current brake; and
   an energy accumulator,
   wherein, in an emergency braking mode for braking the wheel, the brake system is designed for the purpose of supplying the eddy current brake in parallel with energy provided by means of the electric machine operating as a generator and with electrical energy taken from the energy accumulator,
   wherein in a braking mode, the electric machine and the eddy current brake are actuated to brake the wheel, wherein the eddy current brake is electrically decoupled from the energy accumulator and supplied with electrical energy provided by the electric machine.

9. The brake system as claimed in claim 8, wherein the electric machine and the eddy current brake are arranged on a common shaft.

* * * * *